(12) United States Patent
Nagaoka et al.

(10) Patent No.: US 6,310,463 B1
(45) Date of Patent: Oct. 30, 2001

(54) SECONDARY BATTERY CELL PROTECTION CIRCUIT

(75) Inventors: Hiroshi Nagaoka; Yukihiro Terada, both of Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/620,634

(22) Filed: Jul. 20, 2000

(30) Foreign Application Priority Data

Jul. 23, 1999 (JP) .................................................. 11-209121

(51) Int. Cl.[7] ........................................................ H02J 7/00
(52) U.S. Cl. ............................................................ 320/134
(58) Field of Search ..................................... 320/134, 150

(56) References Cited

U.S. PATENT DOCUMENTS

| | | | |
|---|---|---|---|
| 5,705,913 | * 1/1998 | Takeuchi et al. | 320/134 |
| 5,808,446 | * 9/1998 | Eguchi | 320/134 |
| 5,914,586 | * 6/1999 | Fujita et al. | 320/134 |
| 5,959,436 | * 9/1999 | Takashina et al. | 320/134 |
| 5,963,019 | * 10/1999 | Cheon | 320/150 |
| 6,014,030 | * 1/2000 | Smith et al. | 320/134 |
| 6,150,797 | * 11/2000 | Mukainakano | 320/134 |

* cited by examiner

*Primary Examiner*—Peter S. Wong
*Assistant Examiner*—Pia Tibbits
(74) *Attorney, Agent, or Firm*—Ladas & Parry

(57) ABSTRACT

A secondary battery cell protection circuit includes an overcharge detection circuit detecting overcharge of a secondary battery cell, an overcharge prevention MOS transistor including a body-diode which is deactivated by a signal supplied from the overcharge detection circuit when the secondary battery cell is overcharged so as to suspend charging of the secondary battery cell, a discharge detection circuit detecting discharge of the secondary battery cell by comparing a voltage drop through the body-diode of the overcharge prevention MOS transistor with a first standard voltage, and a circuit that activates the overcharge prevention MOS transistor when the discharge detection circuit detects the discharge of the secondary battery cell.

6 Claims, 2 Drawing Sheets

PRIOR ART

SECONDARY BATTERY CELL PROTECTION CIRCUIT

BACKGROUND OF THE INVENTION

1. Field of the Invention

The present invention relates to a secondary battery cell protection circuit. More particularly, the invention relates to a circuit for protecting a secondary battery cell such as a lithium-ion battery that suspends charging of the battery when overcharge of the battery is detected.

2. Description of the Related Art

Compared to a nickel-cadmium and a nickel-hydrogen battery, a lithium-ion battery has an approximately three times higher operating voltage, and double the energy density. Volume energy density of a lithium-ion battery is higher than that of a nickel-cadmium and a nickel-hydrogen battery. Therefore, the size of a lithium-ion battery is smaller, and the weight of the battery is lighter than other batteries having the same energy. Thus, a lithium-ion battery is used for a portable electronic device such as a video camera, a cellular phone, a PHS, and a laptop computer.

For a lithium-ion battery, a protection circuit is used for safety and in order to maximize the performance of the battery. The protection circuit detects overcharge of the battery and suspends charging of the battery. FIG. 2 shows an example of conventional protection circuits for secondary batteries. In FIG. 2, a lithium-ion battery 14 is connected between a positive power-supply terminal 10 and a negative power-supply terminal 12. The positive terminal 10 is connected to an inverting input terminal of a comparator 18 located in an integrated circuit 16. A standard voltage VTH1 is provided for detecting overcharge of the battery, and is supplied to a non-inverting input terminal of the comparator 18 from a constant voltage source 20. An output signal of the comparator 18 is high-level when the voltage of the terminal 10 is lower than the standard voltage VTH1, and is low-level when the voltage of the terminal 10 is higher than VTH1.

The output signal of the comparator 18 is provided to a base of an npn-transistor Q1. The transistor Q1 has its emitter grounded and its collector connected to a collector of a pnp-transistor Q2. The transistor Q2 is diode-connected by connecting its collector and its base together. The pnp-transistor Q2 also forms a current-mirror circuit with its base connected to a base of a pnp-transistor Q3. Each emitter of the pnp-transistor Q2 and the pnp-transistor Q3 is connected to the power-supply terminal 10. A collector of the pnp-transistor Q3 is connected to an output terminal 22, and the output terminal 22 emits an overcharge detection signal. The collector of the transistor Q3 is also connected to one end of a resistor R1 and to a gate of an overcharge preventing MOS transistor Q5. The other end of the resistor R1 is connected to the negative power-supply terminal 12. The overcharge detection signal is supplied to the gate of the overcharge preventing MOS transistor Q5.

In addition, the power-supply terminal 10 is connected to an over-discharge detection unit 24 located in the integrated circuit 16. The over-discharge detection unit 24 outputs an over-discharge detection signal. When the voltage of the terminal 10 is higher than or equal to a standard voltage VTH2, the over-discharge detection signal is high-level. When the voltage of the terminal 10 is lower than the standard voltage VTH2, the signal is low-level. This over-discharge detection signal is then supplied to a gate of a discharge preventing MOS transistor Q4 outside the integrated circuit 16.

A negative pole of the lithium-ion battery 14 is connected to a source of the discharge preventing MOS transistor Q4. A drain of the MOS transistor Q4 is connected to a drain of the overcharge preventing MOS transistor Q5, and a source of the MOS transistor Q5 is connected to the negative power-supply terminal 12. Further, the potential at the negative pole of the battery 14 is set to the ground level. Since the gate is connected to a substrate at each of the MOS transistors Q4 and Q5, body-diodes D4 and D5 are formed between the drain and the source of the respective MOS transistors Q4 and Q5.

The over-discharge detection signal is high-level when the voltage of the power-supply terminal 10 is higher than or equal to the standard voltage VTH2, so that the over-discharge prevention MOS transistor Q4 is activated unless the lithium-ion battery 14 is over discharged. Further, the overcharge detection signal is high-level when the voltage of the terminal 10 is lower than or equal to the standard voltage VTH1. The overcharge preventing MOS transistor Q5 is activated unless the battery 14 is overcharged.

In addition, if the battery 14 is overcharged while charging the battery through a charger circuit that is connected between the terminals 10 and 12, the output signal of the comparator 18 becomes low-level, and the transistor Q1 is deactivated. Consequently, the transistors Q2 and Q3 are deactivated, and the output terminal 22 outputs a low-level overcharge detection signal. As a result, the overcharge preventing MOS transistor Q5 is deactivated, and the battery 14 is no longer charged.

In the above-described prior circuit, after the lithium battery 14 is overcharged and the charging process is stopped, a load such as a video camera, a cellular phone, a PHS, a laptop computer may be connected to the power-supply terminals 10 and 12. When the load is connected, the over-discharge prevention MOS transistor Q4 is active, and the body-diode D5 of the overcharge detection MOS transistor Q5 turns on itself to allow an electrical current to flow from the battery 14 through the body-diode D5 to the load.

Though it is not a problem that the discharged current from the battery 14 flows through the loads, the temperature of the overcharge prevention MOS transistor Q5 increases because of the current flowing not through the overcharge prevention MOS transistor Q5 but through the body-diode D5. Thus, the MOS transistor Q5 deteriorates due to the increase in temperature thereof.

SUMMARY OF THE INVENTION

Accordingly, it is a general object of the present invention to provide a protection circuit for a secondary battery that eliminates one or more of the disadvantages of the related art.

The above-described object of the present invention is achieved by a secondary battery cell protection circuit including:

- an overcharge detection circuit detecting overcharge of a secondary battery cell;
- an overcharge prevention MOS transistor which is deactivated by a signal supplied from the overcharge detection circuit when the secondary battery cell is overcharged so as to suspend charging of the secondary battery cell, the overcharge prevention MOS transistor including a body-diode;
- a discharge detection circuit detecting discharge of the secondary battery cell through the body-diode; and
- a circuit that activates the overcharge prevention MOS transistor when the discharge detection circuit detects the discharge of the secondary battery cell.

In the present invention, the discharge detection circuit detects the discharge of the secondary battery cell through the body-diode. When such discharge of the secondary battery cell is detected, the overcharge prevention MOS transistor is activated so as to discharge the secondary battery cell without having a current passing through the body-diode. Consequently, the substrate temperature of the overcharge prevention MOS transistor does not increase due to the discharged current flowing through the body-diode of the overcharge prevention MOS transistor when the load is connected to the overcharged secondary battery cell. This prevents the overcharge prevention MOS transistor from being deteriorated.

Other objects, features and advantages of the present invention will become more apparent from the following detailed description when read in conjunction with the accompanying drawings.

DESCRIPTION OF THE PREFERRED EMBODIMENTS

A description will now be given of a preferred embodiment of the present invention, with reference to the accompanying drawings.

Figure 1:
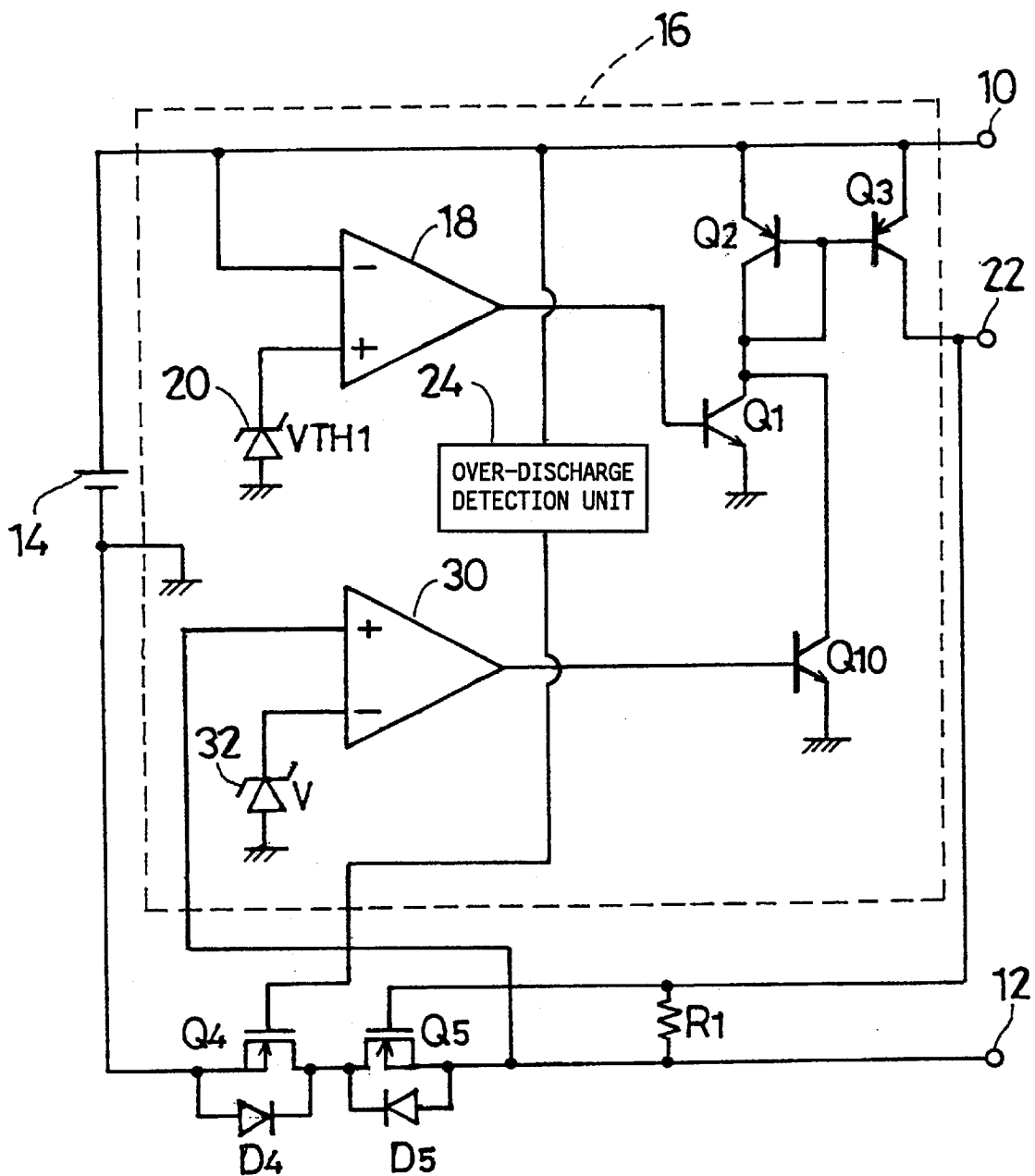
FIG. 1 is a block diagram for the purpose of describing an embodiment of the present invention.
Figure 2:
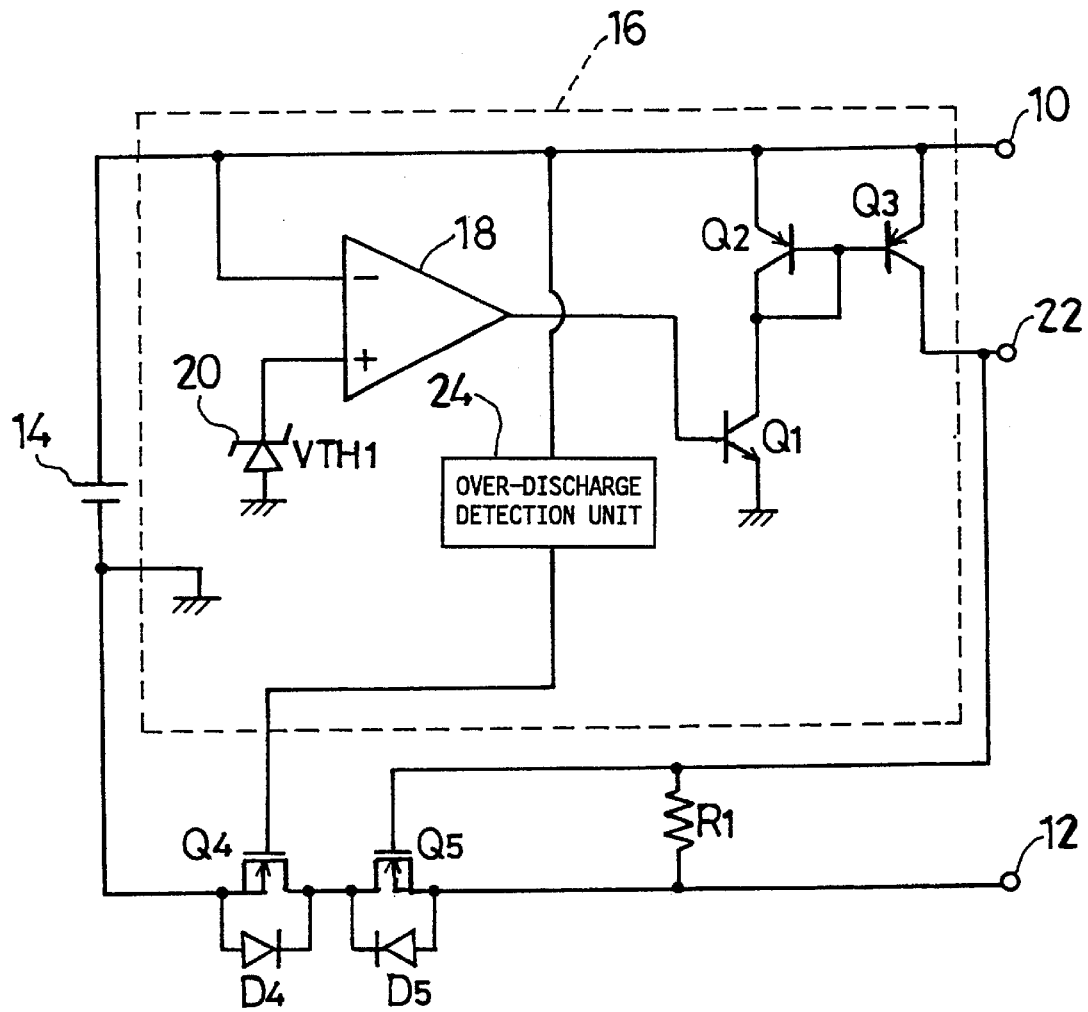
FIG. 2 is a block diagram for the purpose of describing a conventional secondary battery cell protection circuit.

FIG. 1 shows an example of a protection circuit for a secondary battery cell. Also, in FIG. 1, the same symbols are applied to the same parts as FIG. 2. In FIG. 1, the lithium-ion battery 14 is connected between the positive terminal 10 and the negative terminal 12. The terminal 10 is also connected to the inverting input terminal of the comparator 18 in the semiconductor integrated circuit 16. To the non-inverting input terminal of the comparator 18, the standard voltage VTH1 is supplied from the constant voltage source 20 for detecting the overcharge of the battery. The comparator 18 outputs a high-level signal when the voltage at the terminal 10 is lower than or equal to the standard voltage VTH1, then outputs a low-level signal when the voltage at the terminal 10 is higher than the standard voltage VTH1.

The output signal from the comparator 18 is supplied to the base of the npn transistor Q1. The transistor Q1 has its emitter grounded and its collector connected to the collector of the pnp transistor Q2. The transistor Q2 is diode-connected with its base and collector being connected together. The base of the pnp transistor Q2 is connected to the base of the pnp transistor Q3 to form the current-mirror circuit. Emitters of both the transistor Q2 and Q3 are connected to the power-supply terminal 10. The collector of the transistor Q3 is connected to the output terminal 22 that outputs an overcharge detection signal. Also, the collector of the transistor Q3 is connected to one end of the resistor R1 and to the gate of the overcharge protection MOS transistor Q5 outside the IC 16. The other end of the resistor R1 is connected to the negative power-supply terminal 12. The overcharge detection signal is supplied to the gate of the MOS transistor Q5.

The power-supply terminal 10 is connected to the over-discharge detection unit 24 located in the IC 16. The over-discharge detection unit 24 outputs a high-level signal in the case that the voltage at the terminal 10 is higher than or equal to the standard voltage VTH2, and outputs a low-level signal in the case that the voltage at the terminal 10 is lower than VTH2. The over-discharge detection signal is supplied to the gate of the over-discharge protection MOS transistor Q4 outside the IC 16.

Furthermore, the negative power-supply terminal 12 is connected to the non-inverting input terminal of a comparator 30 provided inside the IC 16. To the inverting input terminal of the comparator 30, the standard voltage VTH3 is supplied from a constant voltage source 32 for detecting discharge of the battery. The comparator 30 outputs a high-level signal when the voltage difference between the power-supply terminal 12 and the negative pole of the lithium-ion battery 14 is higher than the standard voltage VTH3. The comparator 30 outputs a low-level signal when the difference is lower than or equal to VTH3.

VTH3 is set higher than a voltage drop through the activated MOS transistors Q4 and Q5, and lower than a voltage drop through the activated body-diode D5 of the MOS transistor Q5. Therefore, the comparator 30 detects the condition that the body-diode is activated and the discharging current flows, and then outputs the discharge detection signal.

The above-described discharge detection signal is supplied to the base of an npn transistor Q10. The transistor Q10 has its collector connected to the collector of the transistor Q1, and has its emitter grounded. The discharge detection signal becomes high-level when detecting the condition that the body-diode D5 is activated and the discharging current flows through D5. When this happens, even if the transistor Q1 is deactivated, the over-discharge detection signal is forced to be high-level since the transistor Q10 is activated to pass the high-level signal through the transistors Q2 and Q3.

The negative pole of the lithium-ion battery 14 is connected to the source of the MOS transistor Q4, the drain of the MOS transistor Q4 is connected to the drain of the MOS transistor Q5, and the source of the MOS transistor Q5 is connected to the negative power-supply terminal 12. Further, the potential of the negative pole of the lithium-ion battery is set to a ground potential. Since the gate is connected to the substrate at each of the MOS transistors Q4 and Q5, the body-diodes D4 and D5. are formed between the drain and the source of the respective MOS transistors Q4 and Q5.

The over-discharge detection signal is high-level when the voltage at the power-supply terminal 10 is higher than or equal to the standard voltage VTH2, and the MOS transistor Q4 is activated unless the lithium-ion battery 14 is over-discharged. The overcharge detection signal is high-level when the voltage of the power-supply terminal 10 is lower than or equal to the standard voltage VTH1, and the MOS transistor Q5 is activated unless the lithium-ion battery 14 is overcharged.

Further, when a charging circuit that is attached between the power-supply terminals 10 and 12 charges the lithium-ion battery 14, the battery 14 may be overcharged, and the output of the comparator 30 becomes low-level. The transistor Q1 is thus deactivated. Consequently, the transistors Q2 and Q3 are deactivated, and the voltage level of the output terminal 22 becomes low-level due to the attached resistor R1 outside the IC 16. With the output terminal 22 being a low-level, the overcharge prevention MOS transistor Q5 is deactivated so as to stop charging of the lithium-ion battery.

A load such as a video camera, a cellular phone, a PHS, and a laptop computer may be connected to the power-supply terminals 10 and 12 after the lithium-ion battery 14 is over-charged and the charging operation is stopped. In this case, the over-discharge prevention MOS transistor Q4 is activated, and the body-diode D5 of the overcharge prevention MOS transistor Q5 is also activated. Consequently, the current from the lithium-ion battery 14 flows through the body-diode D5 to the loads.

However, since the discharged current from the battery 14 flows through the body-diode D5, the comparator 30 outputs the high-level discharge detection signal. Consequently, the transistor Q10 is activated to turn on the transistors Q2 and Q3, so that the over-discharge detection signal at the output terminal is pulled up to the high level. With this signal being at the high level, the overcharge prevention MOS transistor Q5 is activated, and the discharged current from the lithium-ion battery 14 flows through the overcharge prevention MOS transistor Q5 to the load. Therefore, substrate temperature of the overcharge prevention MOS transistor Q5's substrate does not increase, preventing the overcharge prevention MOS transistor Q5 from being deteriorated.

In the above-described embodiment, it is not always necessary to include the over-discharge detection unit 24 and the over-discharge prevention MOS transistor Q4, and the invention is not limited to the above embodiment. The comparator 18, the comparator 30, and the transistor Q10 correspond to the overcharge detection circuit, the discharge detection circuit, and the circuit that activates the overcharge prevention MOS transistor, respectively in the claims.

The present invention is not limited to the specially disclosed embodiments and variations, and modifications may be made without departing from the scope and spirit of the invention.

The present application is based on Japanese Priority Application No. 11-209121, filed on Jul. 23, 1999 with the Japanese Patent Office, the entire contents of which are hereby incorporated by reference.

What is claimed is:

1. A secondary battery cell protection circuit, comprising:

an overcharge detection circuit detecting overcharge of a secondary battery cell;

an overcharge prevention MOS transistor which is deactivated by a signal supplied from said overcharge detection circuit when the secondary battery cell is overcharged so as to suspend charging of the secondary battery cell, said overcharge prevention MOS transistor including a body-diode;

a discharge detection circuit detecting discharge of the secondary battery cell through said body-diode; and a circuit that activates the overcharge prevention MOS transistor when said discharge detection circuit detects the discharge of the secondary battery cell.

2. The secondary battery cell protection circuit as claimed in claim 1, wherein the overcharge detection circuit compares a charge voltage of the secondary battery cell with a first standard voltage.

3. The secondary battery cell protection circuit as claimed in claim 1, wherein said discharge detection circuit detects said discharge of the secondary battery cell by comparing a voltage drop through said overcharge prevention MOS transistor with a second standard voltage.

4. An integrated circuit for use with an overcharge prevention MOS transistor which includes a body-diode and is deactivated when a secondary battery cell is overcharged so as to suspend charging of the secondary battery cell, said integrated circuit comprising;

an overcharge detection circuit detecting overcharge of the secondary battery cell so as to deactivate the overcharge prevention MOS transistor;

a discharge detection circuit detecting discharge of the secondary battery cell through said body-diode; and a circuit that activates the overcharge prevention MOS transistor when said discharge detection circuit detects the discharge of the secondary battery cell.

5. The integrated circuit as claimed in claim 4, wherein the overcharge detection circuit compares a charge voltage of the secondary battery cell with a first standard voltage.

6. The integrated circuit as claimed in claim 4, wherein said discharge detection circuit detects said discharge of the secondary battery cell by comparing a voltage drop through said overcharge prevention MOS transistor with a second standard voltage.

* * * * *